United States Patent [19]

Inaba et al.

[11] Patent Number: 5,217,725
[45] Date of Patent: Jun. 8, 1993

[54] ELECTRICALLY DRIVEN TYPE INJECTION MOLDING APPARATUS

[75] Inventors: Ryohei Inaba, Kawasaki; Masaaki Kumamura, Yokohama; Shojiro Danmoto, Ushiku; Mitsuo Arai, Chichibu; Yozo Tobo, Sagamihara; Hirofumi Sugawara, Yokohama; Tadanobu Miyazaki, Ushiku, all of Japan

[73] Assignee: Canon Kabushiki Kaisha, Tokyo, Japan

[21] Appl. No.: 804,989

[22] Filed: Dec. 10, 1991

Related U.S. Application Data

[62] Division of Ser. No. 514,751, Apr. 26, 1990, Pat. No. 5,110,522.

[30] Foreign Application Priority Data

| Apr. 26, 1989 | [JP] | Japan | 1-104515 |
| Jun. 2, 1989 | [JP] | Japan | 1-139258 |
| Jun. 2, 1989 | [JP] | Japan | 1-139259 |
| Jun. 2, 1989 | [JP] | Japan | 1-139260 |
| Jun. 2, 1989 | [JP] | Japan | 1-139261 |
| Mar. 20, 1990 | [JP] | Japan | 2-72934 |

[51] Int. Cl.[5] ................................ B29C 45/76
[52] U.S. Cl. ................................ 425/145; 264/40.4; 425/147; 425/171
[58] Field of Search ............ 425/135, 145, 147, 169, 425/171, 542; 264/40.3, 40.4, 40.5

[56] References Cited

U.S. PATENT DOCUMENTS

| 4,579,515 | 4/1986 | Kawaguchi et al. | 425/136 |
| 4,592,712 | 6/1986 | Gutjahr | 425/145 |
| 4,693,676 | 9/1987 | Inaba | 425/145 |
| 4,735,564 | 4/1988 | Sasaki et al. | 425/145 |
| 4,755,123 | 7/1988 | Otake | 425/145 |
| 4,828,473 | 5/1989 | Otake et al. | 425/145 |
| 5,092,753 | 3/1992 | Kumamura et al. | 425/145 |
| 5,102,587 | 4/1992 | Kumamura et al. | 425/145 |

Primary Examiner—Tim Heitbrink
Attorney, Agent, or Firm—Fitzpatrick, Cella, Harper & Scinto

[57] ABSTRACT

An injection molding apparatus uses motors to effect measuring and kneading of a material to be molded and injection driving. The amount of movement of a rotary shaft or rectilinearly moving means connected to a screw is detected by a sensor, and the driving of the volume measuring motor and the injection motor is effected by the output of the sensor.

6 Claims, 12 Drawing Sheets

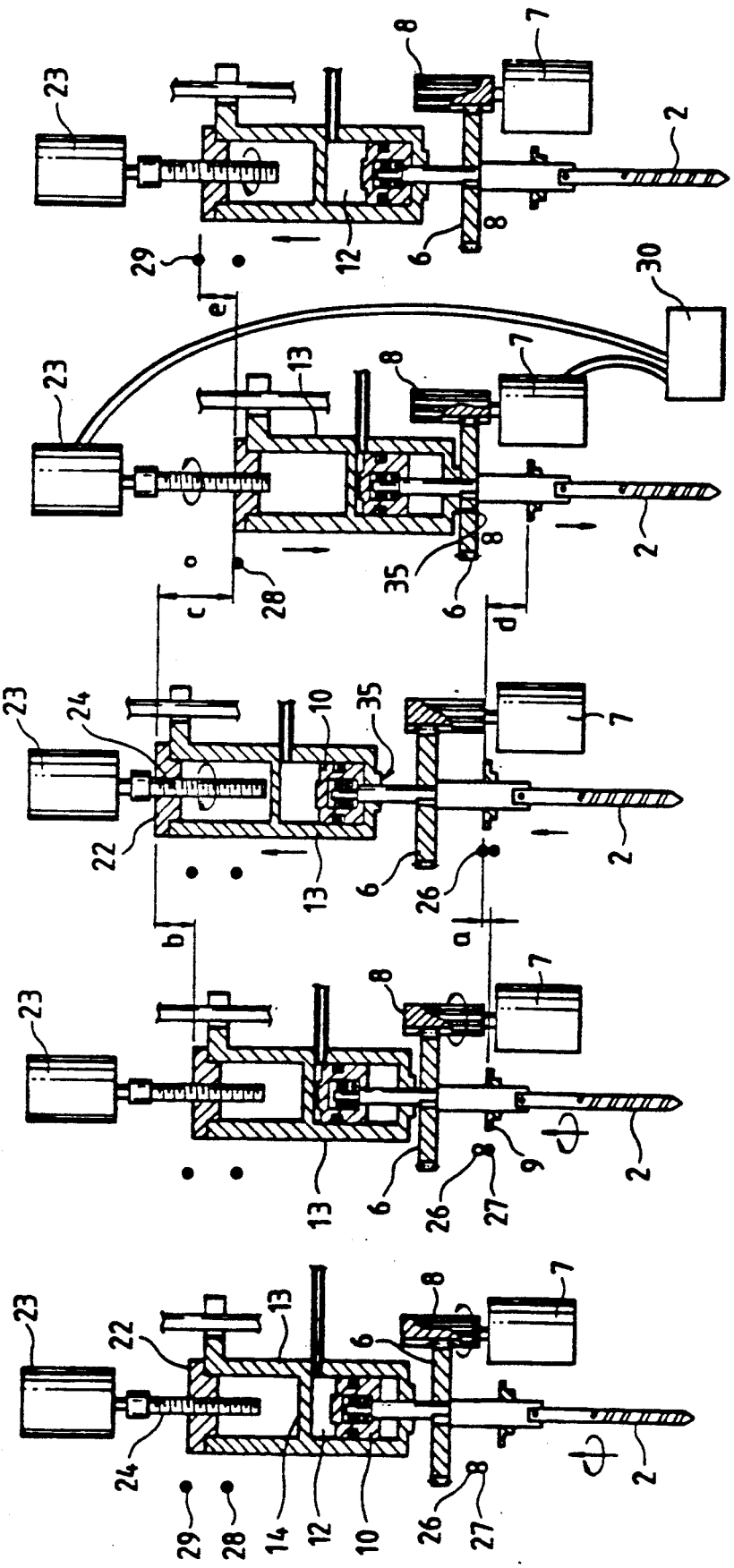

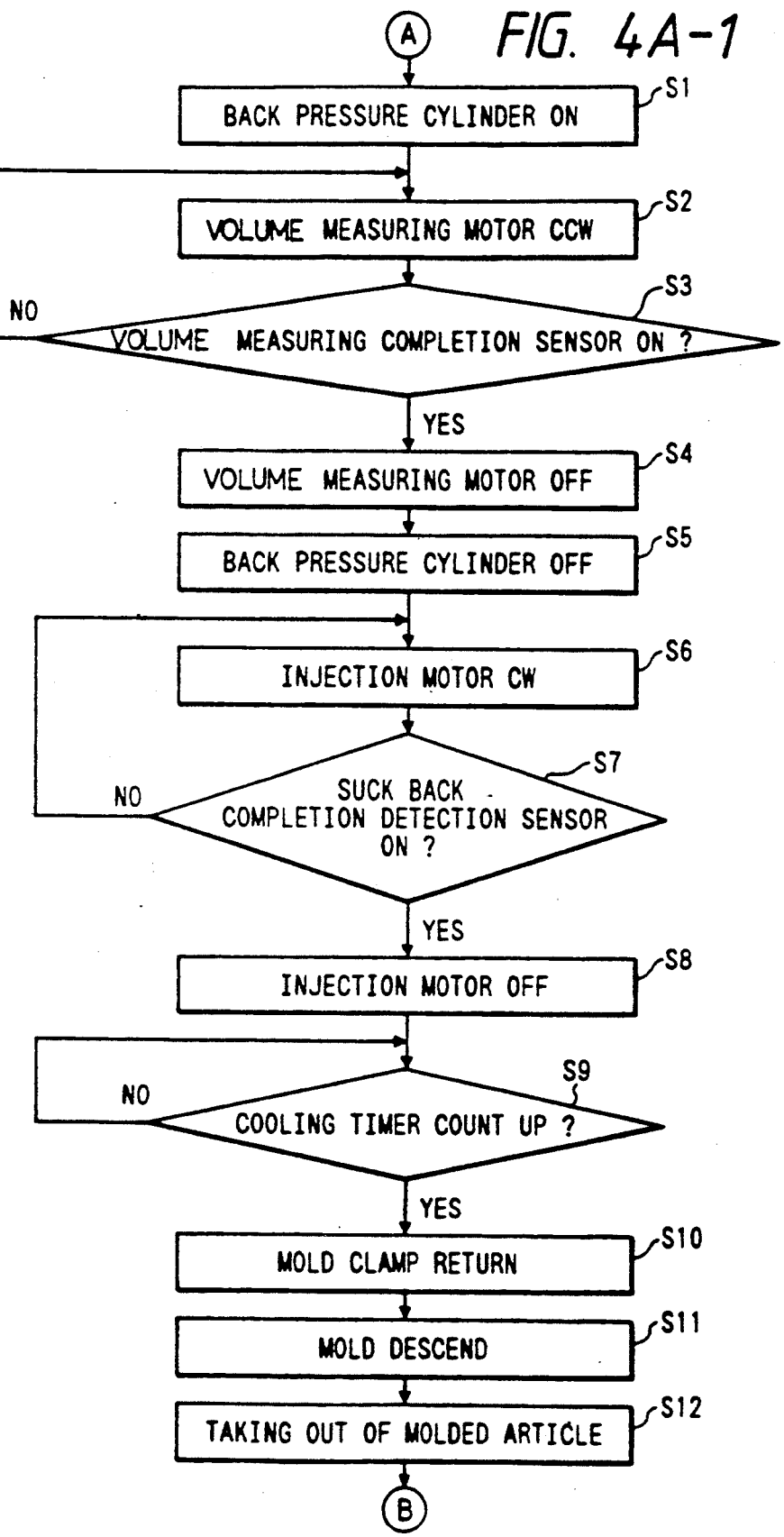

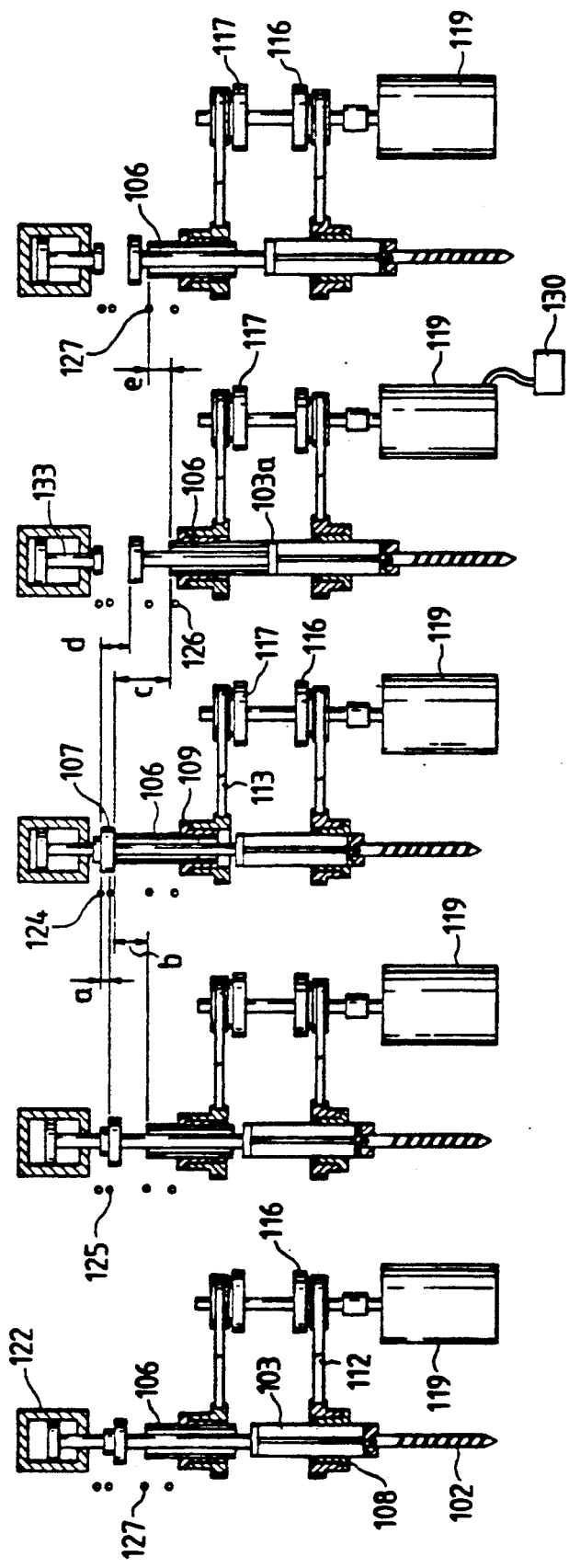

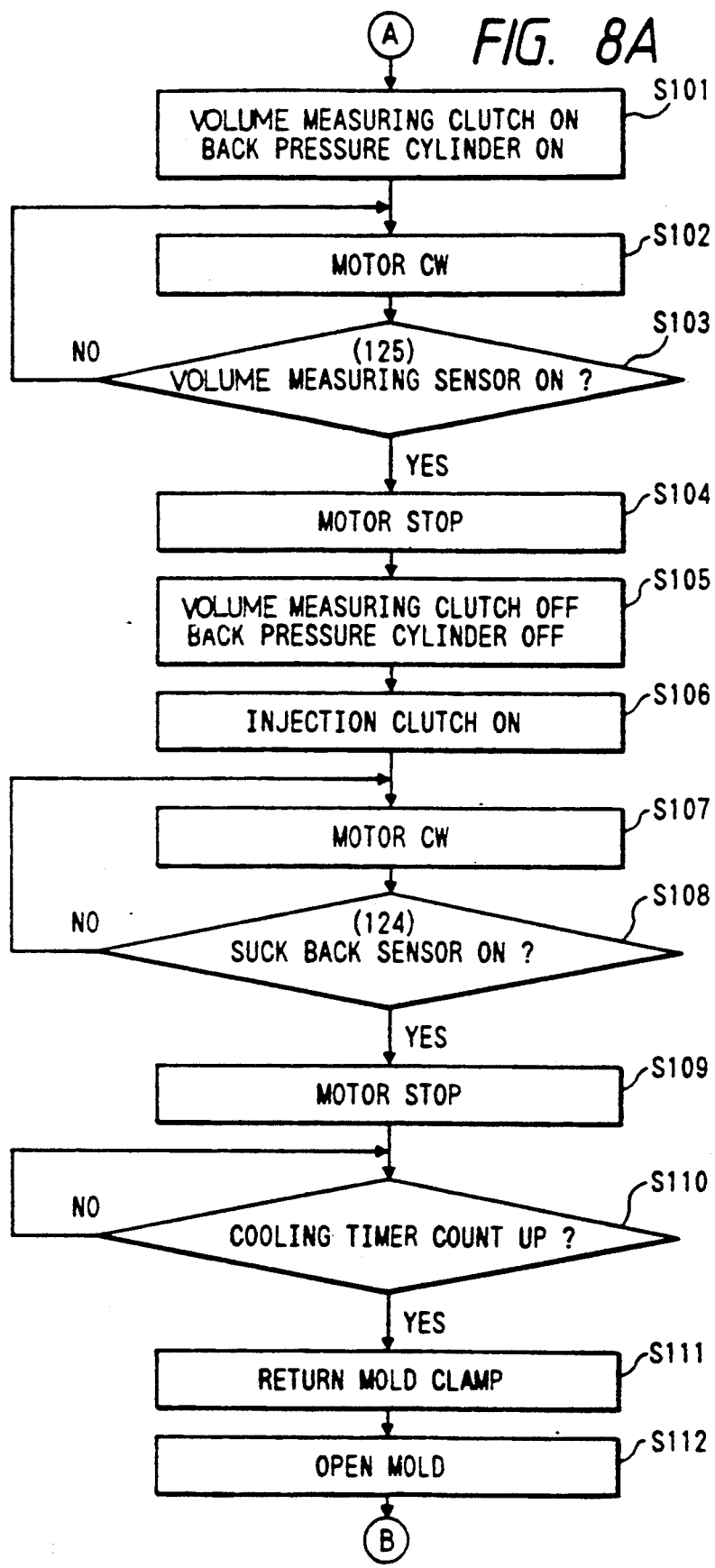

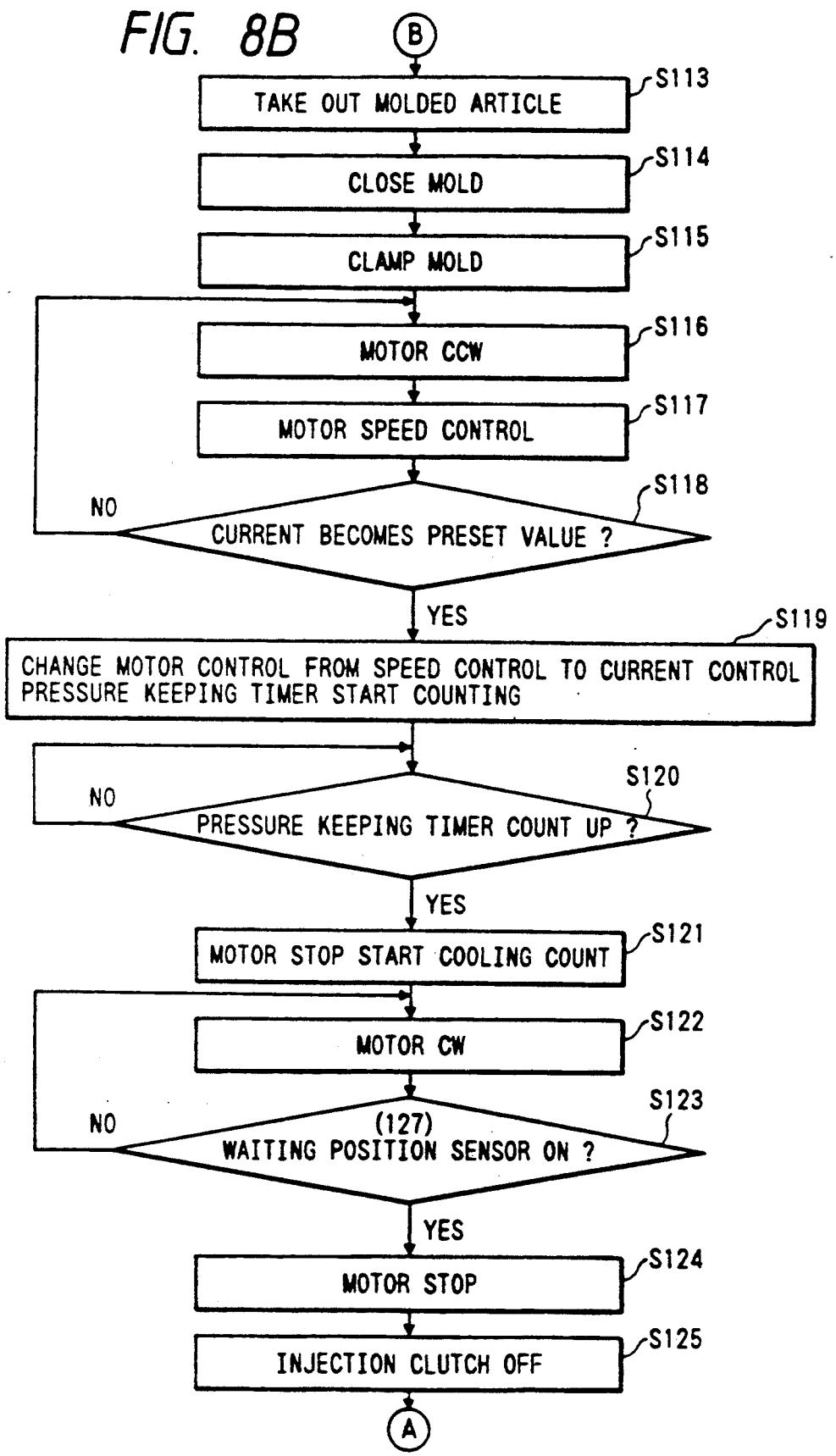

ELECTRICALLY DRIVEN TYPE INJECTION MOLDING APPARATUS

This application is a division of U.S. patent application Ser. No. 07/514,751 filed Apr. 26, 1990 now U.S. Pat. No. 5,110,522.

BACKGROUND OF THE INVENTION

1. Field of the Invention

This invention relates to an electrically driven type injection apparatus, and more particularly to an electrically driven type injection apparatus in which the rotational movement and rectilinear movement of a screw for kneading and injecting a material to be molded are effected by an electric motor.

2. Related Background Art

In an injection molding method wherein a material to be molded such as plastic is injected into a molding metal mold to thereby manufacture a molded article, use has heretofore been made chiefly of hydraulic type and electrically driven type injection apparatuses.

Here, a hydraulic type injection apparatus according to the prior art will first be described with reference to FIG. 9 of the accompanying drawings.

This hydraulic type injection apparatus is comprised chiefly of a hopper 71, a screw 73 for mulling and measuring resin amount charged from the hopper in a cylinder 72, a motor 51 for rotatively driving the screw, and a direct-acting type cylinder 52 for injecting the kneaded resin, and the motor 51 and the direct-acting type cylinder 52 have usually adopted the hydraulic driving type in which a great output can be easily obtained.

An electrically driven type injection apparatus disclosed in Japanese Patent Publication No. 61-57168 will now be described with reference to FIG. 10 of the accompanying drawings.

In FIG. 10, the reference numeral 53 designates a screw contained in a heating cylinder 66. This screw is fixed to a driven gear 54 for rotating the screw which is disposed rearwardly. The reference numeral 56 denotes a support member slidably guided by a guide bar 57. This support member rotatably supports the driven gear 54 for rotating the screw and has secured thereto a ball nut 55 to which is fitted a ball bearing screw 58 whose fore end bears against the shaft of the gear 54. A driven gear 59 for propulsion is secured to the ball bearing screw 58. The driven gear 54 for rotating the screw and the driven gear 59 for propulsion are disposed above the rotary shaft of a motor 62, and are connected to driving gears 63 and 64, respectively, which are connected together by clutches 60 and 61.

In this apparatus, there is also provided a back pressure brake unit 65 behind the driven gear 59 for propulsion so that the retracting operation of the screw 53 may be effected from rearward of this gear 59. Thus, when the screw 53 is retracted by the kneading and measurement of resin charged from a hopper 74 into a heating cylinder 66, the ball nut 55 retracts through the gear 54 and the support member 56, and the ball bearing screw 58 is rotated and in accordance therewith, the gear 59 is rotated. When the end surface of this gear 59 which is being rotated is pressed by the back pressure brake unit 65, the rotation of the gear 59 can be braked by a slip torque created between the two and thus, the back pressure against the screw 53 may be provided.

However, the above-described injection apparatuses according to the prior art have suffered from problems as mentioned below.

In the hydraulic type injection apparatus as shown in FIG. 9, (1) a hydraulic pump and surrounding devices such as piping facilities are required and therefore, a wide installation space for the injection molding apparatus is required, and (2) because of oil mist or the like produced from a hydraulic driving instrument, it is impossible to use the injection molding apparatus under a clean environment.

On the other hand, in the electrically driven type injection apparatus as shown in FIG. 10, the problems peculiar to the hydraulic type injection apparatus are eliminated, but (1) to impart back pressure, it is necessary to control this back pressure by the sum of a force for converting the rectilinear movement of the ball nut, etc. during the retraction of the screw into the rotational movement of the ball bearing screw, etc. and a force produced from slip torque by a brake pressed against the end surface of a gear or the like and therefore, there are required many parameters for the back pressure (such as the rotational resistance of the ball bearing screw or the like, the frictional force of a brake plate and the produced output of the brake) and the setting of conditions becomes complicated, and (2) because of a construction in which the rotatively driven gear and the propulsion-driven ball nut are supported by one and the same support member and are moved with the screw at a time, a guide for stopping the rotation of the support member becomes necessary and a wide installation space around the driving system is required, and the construction becomes complicated.

SUMMARY OF THE INVENTION

It is a first object of the present invention to provide, in an injection molding apparatus wherein the kneading, measurement and injection operation of a material to be molded are controlled by motors, a molding method capable of accurately accomplishing the control of the measurement and kneading and the control of injection molding.

More particularly, the present invention proposes a molding method in which rectilinearly moving means for converting the rotation of said injection motor into rectilinear movement is connected to said screw through a rotary shaft, said screw and the volume measuring motor are connected together through said rotary shaft, and the control of said volume measuring motor and the control of said injection motor are effected by the detection of the amount of movement of said rectilinearly moving means and/or said rotary shaft, whereby the driving of each motor is accurately effected to thereby obtain a highly accurate molded article.

Further, in the present invention, said volume measuring motor and said injection motor cause the movement of said rectilinearly moving means and said rotary shaft to be detected by a sensor and the output signal of this sensor is logically controlled to thereby effect the driving of each motor.

It is another object of the present invention to provide an electrically driven type injection apparatus in which a device for imparting the back pressure of a screw and a control source therefor are constructed of a simple mechanism and the compactness of screw propulsion and rotation mechanisms is made possible.

In order to solve the task as noted above, the electrically driven type injection apparatus of the present invention is characterized by a screw for kneading a material to be molded in a cylinder and injecting the material therefrom, a first motor for rotating said screw and measuring the amount of the material, a back pressure cylinder connected to the rear of said screw for imparting back pressure to said screw, rectilinearly moving means connected to the rear of said back pressure cylinder for rectilinearly moving said back pressure cylinder, and a second motor for driving said rectilinearly moving means.

It is still another object of the present invention to provide an injection apparatus which is made compact by constructing the injection apparatus which has heretofore been constructed of a complicated mechanism by a simple mechanism.

In order to solve the above-noted task, the electrically driven type injection apparatus of the present invention is an electrically driven type injection apparatus in which the rotational movement and rectilinear movement of a screw contained in a heating cylinder are effected by an electric motor, characterized in that a rectilineary moving mechanism and a rotating mechanism for said screw and a back pressure mechanism are disposed in series on the propulsion shaft of said screw.

In the aforedescribed prior-art apparatuses shown in FIGS. 9 and 10, to impart back pressure, it is necessary to control this back pressure by the sum of a force for converting the rectilinear movement of the ball nut or the like during the retraction of the screw into the rotational movement of the ball bearing screw or the like and a force produced from slip torque by the brake pressed against the end surface of the gear or the like and therefore, there are required many parameters for the back pressure (such as the rotational resistance of the ball bearing screw or the like, the frictional force of the brake plate and the produced output of the brake) and the setting of conditions becomes complicated. The back pressure regulating method of the present invention comprises connecting an injection motor to a screw for injecting a material to be molded kneaded in a heating cylinder through a rectilinearly moving mechanism for converting the rotational movement of the motor into rectilinear movement, and causing a load for back pressure regulation to act on said rectilinearly moving mechanism by the rotational movement of said injection motor with the retraction of said rectilinearly moving mechanism being permitted during weight measurement.

Further, the present invention proposes, in an injection molding apparatus wherein the injection operation is effected by a volume measuring and kneading motor and an injection motor, a novel construction of a mechanism for converting the rotation of the motors into rectilinear movement. That is, in the motor type injection apparatus according to the present invention, a ball nut receiving member is fixed to a rotary shaft having connected thereto a screw for injecting a formed material, a ball bearing screw connected to the output shaft of an injection motor is threadably engaged with a ball nut secured to the ball nut receiving member, a volume measuring motor is connected to said rotary shaft through a rotation transmitting gear, and said volume measuring motor is braked during the rotative driving of said injection motor, whereby the rotation of said ball nut may be stopped.

The electrically driven type injection apparatus of the present invention is an electrically driven type injection apparatus in which the rotational movement and rectilinear movement of a screw contained in a heating cylinder are effected by an electric. The injection apparatus features a rotating mechanism, a rectilinearly moving mechanism and a back pressure mechanism disposed on the rear of said screw coaxially with said screw in the order of the rotating mechanism, the rectilinearly moving mechanism and the back pressure mechanism or in the order of the rectilinearly moving mechanism, the rotating mechanism and the back pressure mechanism. The rotating mechanism has a rotary shaft which rotates said screw, on which said screw is axially movably provided, and a first rotative driving force transmitting mechanism for transmitting the rotative driving force from said motor to said rotary shaft. The rectilinearly moving mechanism has a guide shaft having restraining portions on the opposite ends thereof, a hollow ball bearing screw slidably fitted to said guide shaft and provided so as to be restrained by each restraining portion, a ball nut threadably engaged with said hollow ball bearing screw, and a second rotative driving force transmitting mechanism for transmitting the rotative driving force from said motor to said ball nut. In addition, the back pressure mechanism has a back pressure cylinder, and a cylinder rod for pressing said guide shaft or said rotary shaft.

As described above, the electrically driven type injection apparatus of the present invention comprises, as main elements, a screw contained in a cylinder, a rotating mechanism for rotating this screw, a forwardly moving mechanism for forwardly moving the screw, and a back pressure mechanism for imparting back pressure to the screw. The rotating mechanism and said forwardly moving mechanism are disposed coaxially with said screw in the order of the rotating mechanism and the forwardly moving mechanism or in the order of the forwardly moving mechanism and the rotating mechanism. The back pressure mechanism for imparting back pressure to the screw is provided on the rear of said rotating mechanism or said forwardly moving mechanism of the above-described construction. Accordingly, these elements are of a construction in which they are successively arranged on the propulsion shaft of the screw, and for example, by disposing each element vertically, the installation area for the entire apparatus may be very small.

As regards the rotating mechanism for the screw, an electric motor and a rotary shaft for rotating this screw are connected together by the first rotative driving force transmitting mechanism, whereby the rotative driving force of the motor can be transmitted to the screw.

The forwardly moving mechanism for the screw comprises a ball bearing screw mechanism and said electric motor connected by the second rotative driving force transmitting mechanism to the ball nut of the ball bearing mechanism which comprises a guide shaft having restraining portions on the opposite ends thereof, a hollow ball bearing screw slidably fitted to the guide shaft and provided so as to be restrained by each restraining portion, and a ball nut threadably engaged with the hollow ball bearing screw, whereby when the ball nut is rotated, the hollow ball bearing screw slides on the guide shaft to thereby push out the restraining portions of the guide shaft, whereby propulsion can be imparted to the screw.

In the injection apparatus of such construction, a clutch mechanism can be provided for the first and second rotative driving force transmitting mechanisms, and by the change-over of this clutch, the drive source of each rotative driving force transmitting mechanism can be constructed of a single electric motor.

The back pressure mechanism for the screw has a back pressure cylinder and a cylinder rod provided therein, and by this cylinder rod acting on said rotating mechanism or said forwardly moving mechanism, back pressure can be imparted to the screw. This back pressure mechanism is of the cylinder-driven type and therefore is simple in construction, and a control source therefor can also be constructed of a simple mechanism.

BRIEF DESCRIPTION OF THE DRAWINGS

FIGS. 3A-3E illustrate the operation of the electrically driven type injection apparatus shown in FIG. 1.

FIGS. 7A-7E and 8A-8B are an illustration and a flow chart, respectively, of the operation of the second embodiment.

DESCRIPTION OF THE PREFERRED EMBODIMENTS

An embodiment of the present invention will hereinafter be described with reference to the drawings.

Figure 1:
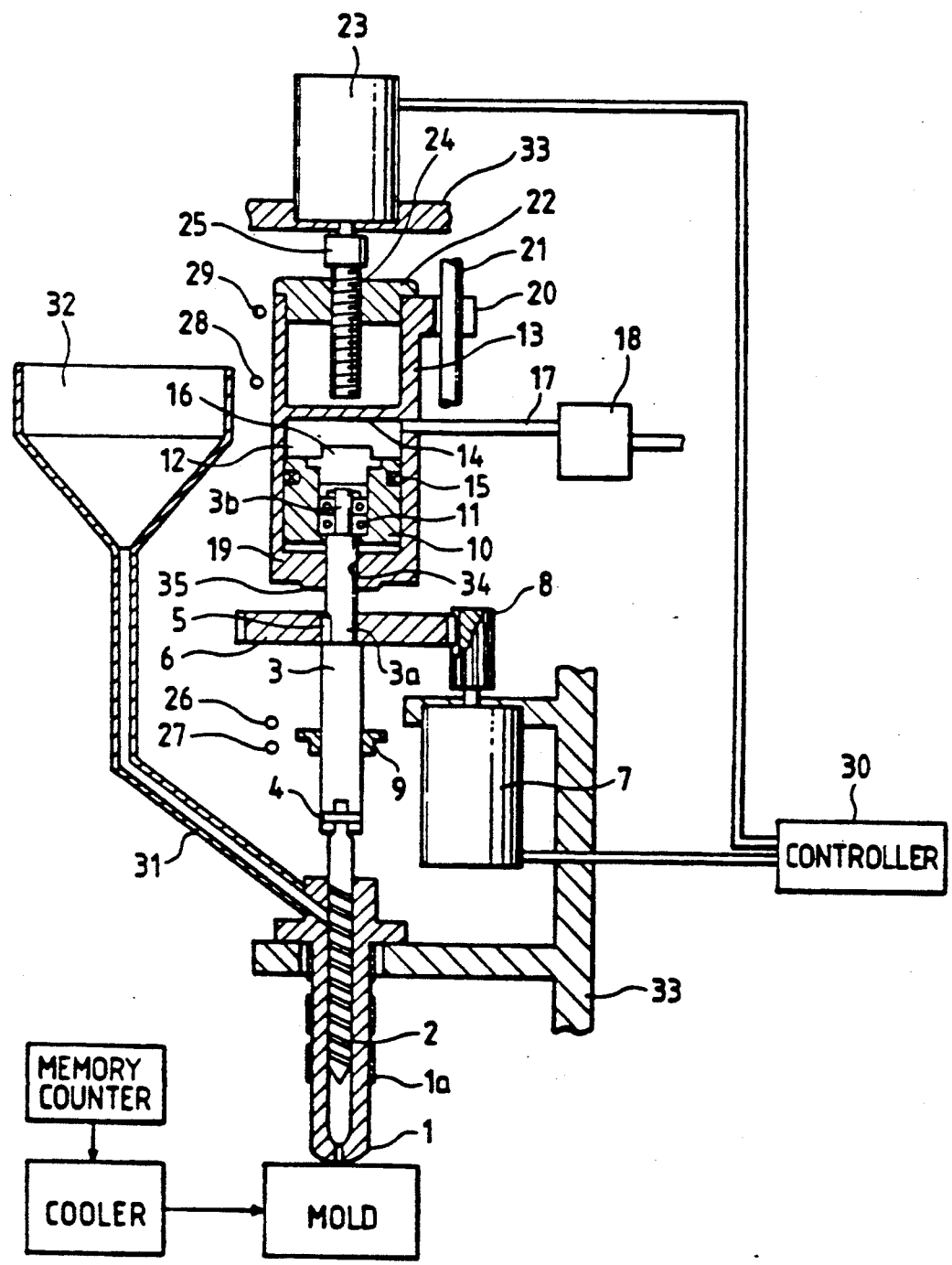
FIG. 1 is a schematic cross-sectional view of an electrically driven type injection apparatus according to an embodiment of the present invention.
Figure 2:
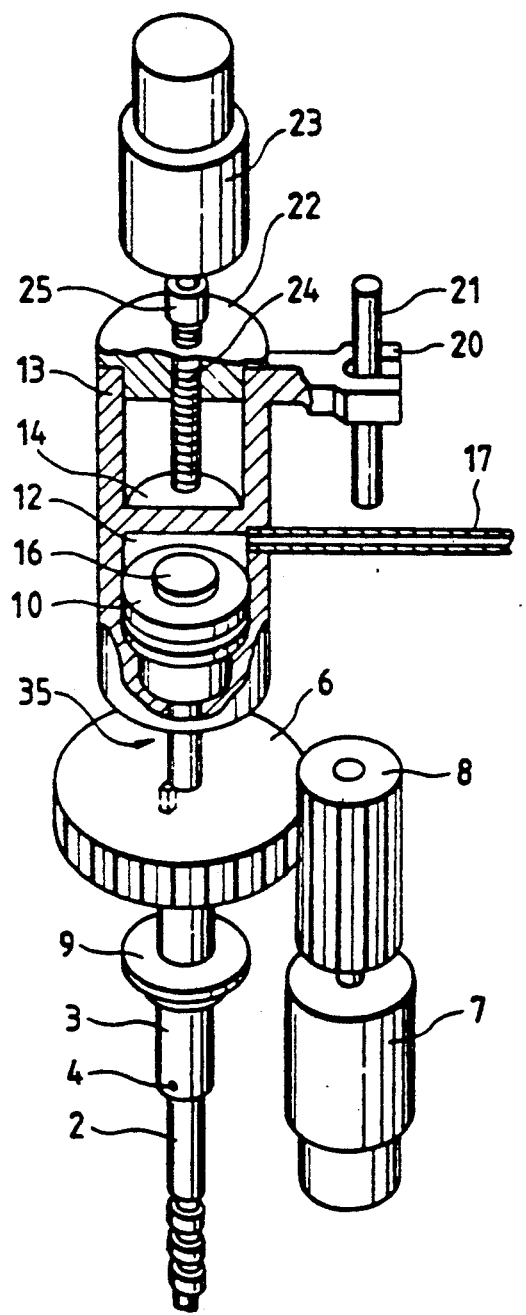
FIG. 2 is a perspective view of the vicinity of a rotating mechanism, a rectilinearly moving mechanism and a back pressure mechanism in FIG. 1.

FIG. 1 is a schematic cross-sectional view of an electrically driven type injection apparatus according to the present embodiment, FIG. 2 is a perspective view of the vicinity of a rotating mechanism, a rectilinearly moving mechanism and a back pressure mechanism, FIGS. 3A-3E illustrate the operation of the present embodiment, and FIG. 4 is a flow chart of the injection molding by the apparatus of the present embodiment.

In the electrically driven type injection apparatus of the present embodiment, as shown in FIGS. 1 and 2, a screw 2 contained in a heating cylinder 1, a rotary shaft 3 fixed to the rear of the screw 2 by a pin 4, a follower side spur gear 6 secured by a key 5 to an intermediate rotary shaft 3a comprising the upper portion of the rotary shaft 3 which is reduced in diameter from the lower portion of the rotary shaft, a back pressure cylinder 12 designed to push out the rotary shaft 3, a rectilinearly moving cylinder 13 integrally connected to the upper portion of the back pressure cylinder through a partition wall 14, and an injection motor 23 provided through a coupling 25 on a ball bearing screw 24 fitted to a ball nut 22 secured to the rear of the rectilinearly moving cylinder are disposed longitudinally on the same straight line as the screw 2.

The reference numeral 32 designates a hopper. A material to be molded charged into this hopper is supplied into the cylinder 1 through a pipe 31.

A through-hole 34 is formed in the central portion of the shoulder 19 of the rectilinearly moving cylinder which is formed on the lower end portion of the back pressure cylinder 12, the intermediate rotary shaft 3a of the rotary shaft 3 is slidably provided in the through-hole 34, and further an upper rotary shaft 3b of smaller diameter than the intermediate rotary shaft 3a is rotatably provided on the upper portion of the intermediate rotary shaft 3a through a bearing unit 11 provided in the hollow portion of a piston 10. However, the upper rotary shaft 3b is engaged with the bearing unit 11 at the upper end portion of the upper rotary shaft 3b so as to follow the vertical movement of the piston 10. A packing 15 is fitted to the outer periphery of the piston in the back pressure cylinder 12, and further a lid portion 16 is fitted to the central upper portion of the piston to thereby prevent the leakage of compressed fluid supplied into the back pressure cylinder.

Sideways of the rotary shaft 3, a volume measuring electric motor 7 for rotatively driving a drive side spur gear 8 meshing with the follower side spur gear 6 secured to the intermediate rotary shaft 3a is mounted on an injection unit base 33. The drive side spur gear 8 has a wide tooth form and will never be disengaged from the follower side spur gear 6 even if the rotary shaft 3 moves up and down.

By such a construction, the volume measuring motor 7 rotatively drives the rotary shaft 3 to thereby rotate the screw 2 in the cylinder 1, and effects measurement while kneading the material to be molded in the cylinder. The volume measuring motor 7 and the injection motor 23 are connected to a controller 30, whereby the respective motors can be controlled.

A protruded piece 20 having its tip end bifurcated is provided sideways of the rectilinearly moving cylinder 13, and a through-hole formed in this protruded piece is slidably fitted over a guide shaft 21 secured to the injection unit base 33. The guide shaft 21 is provided in parallel with to the screw 2, and by the rectilinearly moving cylinder 13 being guided and moved by the guide shaft 21, the rectilinearly moving cylinder 13 can be moved vertically only in the direction of propulsion of the screw 2.

The rectilinearly moving cylinder 13 can be moved vertically by the ball bearing screw 24 being rotated by the guiding action of the guide shaft 21 and the rotative driving of the injection motor 23 and the ball nut 22 threadably engaged with the ball bearing screw being moved relative to the ball bearing screw 24. Accordingly, when the rectilinearly moving cylinder 13 is moved downwardly by the rotation of the injection motor 23 and the lid portion 16 of the piston in the back pressure cylinder 12 bears against the partition wall 14, the rotary shaft 3 is pushed down and thus, the screw 2 moves forward in the cylinder 1. Also, by the rotative driving of the injection motor 23, the ball bearing screw 24 is rotated in the direction opposite to the direction described above to thereby move the rectilineary moving cylinder 13 upwardly, and when the lower end portion of the piston 10 bears against the upper end portion of the shoulder 19 of the rectilinearly moving cylinder, the rotary shaft 3 is lifted and thus, the screw 2 is retracted upwardly.

The reference numerals 26, 27, 28 and 29 designate sensors for detecting the stroke of the screw 2. The sensor 26 is a suck back completion detecting sensor, and the sensor 27 is a volume measuring completion detecting sensor which detects the vertical position of the screw 2 by a sensor dog 9 secured to the middle portion of the rotary shaft 3. The sensor 28 is a screw overrun detecting sensor, and the sensor 29 is a sensor for detecting the waiting position of the rectilinearly moving cylinder 13, and uses the side surface of the rectilinearly moving cylinder 13 as a sensor dog to detect the vertical positions of the rectilinearly moving cylinder 13 and the screw 2. The above-described sensors 26, 27, 28 and 29 are connected to a controller, not shown, and the signal of each sensor is supplied to the controller 30 to control the injection motor 23 and the weight measuring motor 7.

The injection unit base 33 is formed as a unit and has mounted thereon the injection motor 23, the guide shaft 21, the volume measuring motor 7, the heating cylinder 1, etc. However, for the convenience of illustration, the unit base 33 is shown only fragmentarily.

When actually injection molding is effected, a molding metal mold is disposed near the fore end of the heating cylinder 1 and also, a device or the like for opening and closing the metal mold or clamping the mold is disposed.

Also, it is to be understood that in the present embodiment, a pressure keeping timer and a cooling timer are provided in the controller 30 to measure the pressure keeping time and the cooling time of a molded article in the metal mold cavity.

Figures 2, 4A:
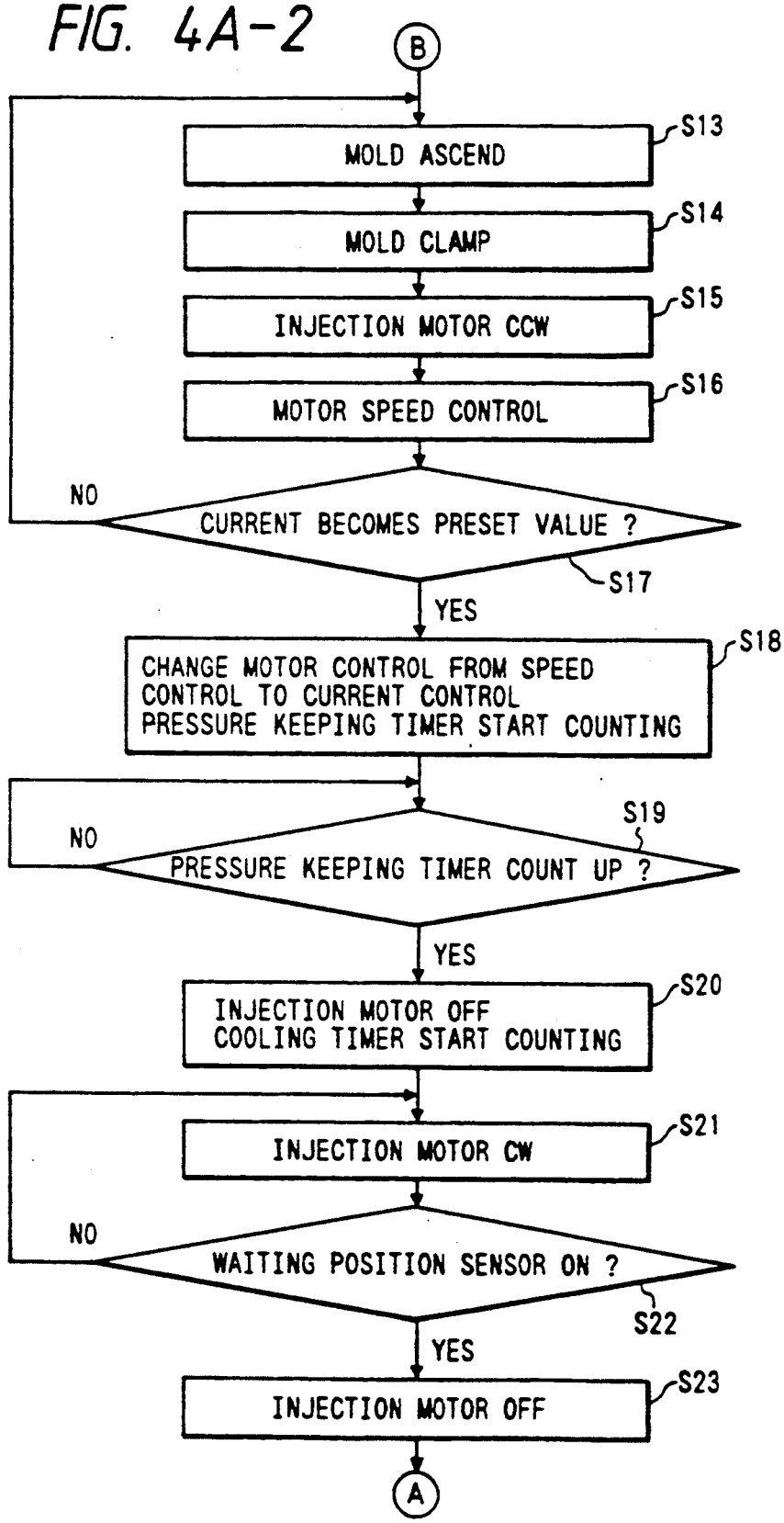
FIG. 4A comprised of FIGS. 4A-1 and 4A-2 is a flow chart of the injection molding by the electrically driven type injection apparatus shown in FIG. 1.

The operation of the electrically driven type injection apparatus of the present embodiment constructed as described above will now be described with reference to the operation illustrations of FIGS. 3A-3E and the flow chart of FIG. 4. The symbols indicated with S in parentheses show the steps in the flow chart of FIG. 4A.

A) The volume measuring and kneading stroke

FIG. 3A shows the state of the measuring and kneading mode. In the case of the measuring and kneading mode, pressure from back pressure generating means 18A acts on the back pressure cylinder 12 in the lower portion of the rectilinearly moving cylinder through a valve 18 and a pressure supply tube 17, and the back pressure cylinder 12 is loaded with a predetermined pressure.

Figure 4B:
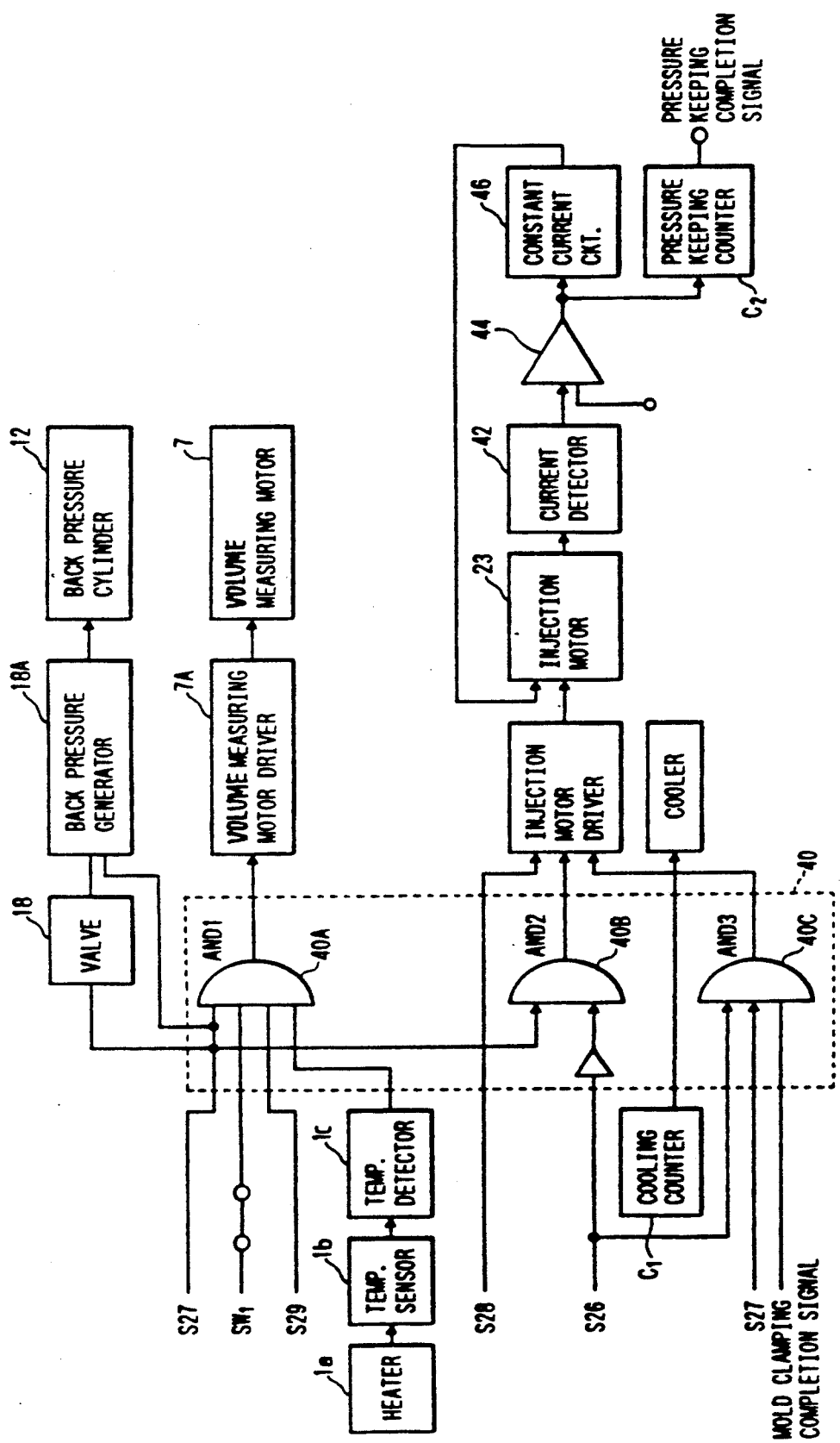
FIG. 4B is a block diagram.

When the start switch $SW_1$ of FIG. 4B is closed, the ON signal of the rectilinearly moving cylinder waiting position detecting sensor 29, the OFF signal of the measuring sensor 27 and the signal from temperature detecting means 1c for measuring the temperature of a heater 1a are input to a first logic circuit 40A.

A temperature sensor 1b is connected to the temperature detecting means 1c, and converts the temperature of the heater 1a into a voltage signal, and in the temperature detecting means 1c, a temperature confirmation signal is output when the temperature of the temperature sensor 1b reaches the temperature of the resin material in its molten state.

The output of the first logic circuit 40A operates a driving circuit 7A for the volume measuring motor, thereby rotating the volume measuring motor 7 in a counter-clockwise direction (CCW) shown in FIG. 3A (step S2).

The screw 2 is rotated through the drive side spur gear 8 and the follower side spur gear 6 and the material to be molded supplied from the hopper 32 is made into a molten state while being kneaded. As this molten material to be molded is accumulated forwardly of the screw 2 in the heating cylinder 1, the screw 2 is retracted upwardly in the heating cylinder 1.

Also, at this time, the back pressure cylinder 12 is in its ON state and therefore, back pressure is imparted to the screw 2 through the rotary shaft 3. By such a back pressure operation, bubbles or the like can be prevented from being produced in the molten material to be molded which is kneaded in the cylinder 1.

If during this measurement and kneading, an electric current for effecting the servo lock operation of the motor 23 is flowed to brake the rotation of the ball bearing screw 24 so that the ball nut 22 may not rotate, an upward thrust as the reaction thereof can act on the partition wall 14 during the driving of the piston 10 to thereby prevent the rectilinearly moving cylinder 13 from ascending.

Then, as shown in FIG. 3B, the screw 2 ascends and the measuring completion detecting sensor 27 becomes ON (step S3). When the sensor 27 becomes ON, the supply of electric power from the first logic circuit 40A to a driver 7A is cut off and the motor 7 is stopped, thus completing the measurement and kneading. The valve 18 which is supplying pressure to the back pressure cylinder 12 receives the ON signal of the measuring completion detecting sensor 27 and releases the back pressure action of the back pressure cylinder (step S5).

B) Suck back stroke

The ON signal of the measuring completion detecting sensor 27 during the aforedescribed measuring and kneading stroke and the OFF signal of the suck back completion detecting sensor 26 are input to a second logic circuit 40B. Supply of electric power is effected from the motor driving circuit 23A to the motor 23 by the ON signal of the logic circuit 40B to rotate the injection motor 23 clockwise.

When the injection motor 23 is rotated clockwise (CW), the rectilinearly moving cylinder 13 ascends through the ball bearing screw 24 and the ball nut 22, and the lower end portion of the piston 10 bears against the upper end portion of the shoulder 19 of the rectilinearly moving cylinder and the rotary shaft 3 is lifted, whereby the screw 2 ascends. By this ascension of the screw 2, the pressure in the chamber in the cylinder 1 at the fore end of the screw 2 causes a pressure forcing the molten resin material upward to act so that the molten resin material between the screw and the cylinder may not leak from the injection port at the fore end of the cylinder 1.

This suck back is effected to prevent the molten resin material volume-measured at the present step from leaking from the injection port of the cylinder 1 when the metal mold is opened to take out a molded article at the post-step.

When the suck back completion detecting sensor 26 then receives the ON signal upon this ascension of the screw 2 (step S7), the injection motor 23 is stopped (step S8), thus completing suck back.

In FIG. 3C, a indicates the suck back stroke and b indicates the movement stroke of the rectilinearly moving cylinder 13 during suck back.

C) Cooling of the molded article

When at the step S7, the suck back completion detecting sensor 26 becomes ON, a cooling time counting counter $C_1$ for controlling the cooling time of cooling means for cooling the molded article in the metal mold provided below the cylinder 1 terminates counting (step S9).

The cooling of the metal mold at the step S9 is the cooling of the resin poured into the metal mold cavity during the injection before the step S1 of the flow chart of FIG. 4A, and the start of the counting by the cooling counter $C_1$ is effected in the mode of a step S20 which will be described later.

When the cooling of the molded article is completed upon termination of the counting by the cooling counter $C_1$, the clamping of the metal mold is released (step S10), and then the mold is opened (step S11), and the molded article is taken out (step S12), and the mold is again closed (step S13) and is clamped (step S14).

D) Injection stroke

The mold clamp completion signal in the mold clamp mode of the step S14 and the signals of the weight measuring sensor 27 and the suck back completion detecting sensor 26 are input to a third logic circuit 40C. The injection motor 23 is rotated counterclockwise by the signal of the logic circuit 40C, whereby the molten resin material is injected into the metal mold (step S15). That is, by the injection motor 23 being rotated counterclockwise (CCW), a downward thrust is imparted to the rectilinearly moving cylinder 13. At this time, the rectilinearly moving cylinder 13 is first idly fed, whereafter the thrust transmitting portion 35 of the lower surface of the rectilinearly moving cylinder bears against the spur gear 6 to propel the screw 2.

The control of the motor 23 during the injection is effected by the controller 30, and any variation in the value of the consumed electric current of the motor 23 during the completion of the injection is detected (step S17), and the motor control for injection is changed over from speed control (step S16) to current value control (step S18), whereby the injection is completed, and shift is made to a pressure keeping condition in which a predetermined pressure is applied to the material to be molded. That is, control is effected so that the number of rotations of the motor 23 may become constant in order to keep the injection speed constant. At this time, as the metal mold cavity is filled with the material to be molded, the pressure in the molding mold becomes higher and therefore, it becomes necessary that more electric current flow to the motor 23. Accordingly, in order to determine this constant current value, there is provided detecting means 42 for detecting the electric current flowing to the oil, not shown, of the injection motor 7, and the output of the detecting means 42 is input to comparing means 44 for comparison with a predetermined comparative value.

E) Pressure keeping stroke

The time when the consumed current value has reached the comparative value is the time when the injection stroke is completed. The supply of electric power to the motor 23 is kept constant by a constant current circuit 46 with the aid of the comparison signal of the comparing means 44 to thereby bring about a state in which a predetermined pressure is acting on the resin material in the metal mold cavity. The comparison signal from the comparing means 44 causes a pressure keeping counter $C_2$ for controlling the pressure keeping time to start counting (step S18).

Assuming that FIG. 3D shows the time when the injection is completed, c is the rectilinear movement stroke and d is the injection stroke. The reference numeral 28 designates a screw overrun detecting sensor, and in a normal operation, the injection becomes completed at a position above the sensor 28.

When the pressure keeping timer then counts up (step S19), the motor 23 is stopped to complete pressure keeping, and by the pressure keeping completion signal of the pressure keeping counter $C_2$, the cooling counter $C_1$ starts counting (step S20).

After the completion of the injection, as shown in FIG. 3E, the injection motor 23 is rotated clockwise (step S21), and the rectilinearly moving cylinder 13 is lifted to thereby elevate the screw 2. Thereafter, when a signal indicative of ON of the sensor 29 is received (step S22), the injection motor 23 is stopped (step S23), and the rectilinearly moving cylinder 13 waits.

In FIG. 3E, e is the movement stroke of the rectilinearly moving cylinder.

After the steps as described above have been passed, the back pressure cylinder is rendered ON (step S1), and return is again made to the step shown in FIG. 3A and the volume measuring motor 7 is rotated counterclockwise to start measuring and kneading.

As shown in the above-described embodiment, according to the present invention, there can be provided a construction in which the rotary shaft 3 for rotating the screw 2, the back pressure cylinder 12 for imparting back pressure to the screw and the injection motor 23 for pushing out the back pressure cylinder 12 and imparting an injection force to the screw are disposed vertically on the propulsion shaft of the screw 2 and therefore, the width and depth in the installation area are decreased and the apparatus can be easily introduced into the assembly line in which no molding machine could heretofore be installed.

Also, the back pressure during volume measurement can be imparted by the back pressure cylinder 12 provided at a location whereat the rotary shaft 3 can be directly pressed, and the control of this back pressure can be accomplished by the pressure control of compressed fluid such as air and therefore, the simplification and compactness of the back pressure device can be realized and the regulation of the back pressure can be easily accomplished.

Further, the apparatus of the present embodiment adopts a construction in which the injection motor 23 is directly connected to the ball bearing screw 24 and therefore, there is no necessity of interposing a gear or the like therebetween and correspondingly, the cost can be reduced.

In the above-described embodiment, the rotative driving force transmitting mechanism is of a construction comprising a combination of the wide drive side spur gear 8 and the ordinary follower side spur gear 6, but conversely, the follower side spur gear 6 may be made wide and the drive side spur gear may be made ordinary, and with the rotary shaft 3 as a spline shaft, a rotative driving force transmitting mechanism can also be constructed by a combination of a spline nut engaged with the spline shaft, a timing pulley and a timing belt.

Also, the back pressure mechanism in the above-described embodiment is constructed of a piston connected to the rotary shaft, a cylinder slidable in the axial direction of the screw and a cylinder slidable in the axial direction of the screw, but alternatively, the rotation side may be constructed into a cylinder and the ball nut side may be constructed into a piston.

Further, in the above-described embodiment, the rectilinearly moving mechanism is comprised of a ball nut fixed to a cylinder, and a ball bearing screw threadably engaged with the ball nut, but alternatively, the ball bearing screw may be fixed to the cylinder and the ball nut may be rotatably mounted at a predetermined location on the injection unit base 33 and may be rotated by the injection motor provided at a predetermined location through a gear or the like.

While the above-described embodiment is constructed as a vertical type molding machine, the present invention can also be applied to a horizontal type molding machine.

As described above, the electrically driven type injection apparatus of the present invention can be made into a construction in which the screw, the back pressure cylinder, the rectilinearly moving means and the second motor are disposed on one and the same shaft, and the entire apparatus can be made slim. Further, it is of course possible to dispose these constituents in a vertical row and thereby narrow the installation space for the entire apparatus.

Also, in such electrically driven type injection apparatus of the present invention, the control of the back pressure to be imparted to the screw can be directly accomplished by the pressure control of compressed fluid such as air supplied to the back pressure cylinder and therefore, the back pressure imparting means can be constructed by a simple mechanism, and back pressure regulation can be accomplished simply.

The injection apparatus of the present invention is designed such that the rotational movement and rectilinear movement of the screw are effected by an electric motor and therefore, of course, the environment around the apparatus can always be kept clean.

FIGS. 5 to 8 show a second embodiment of the present invention.

Figures 5A, 5B, 5C:
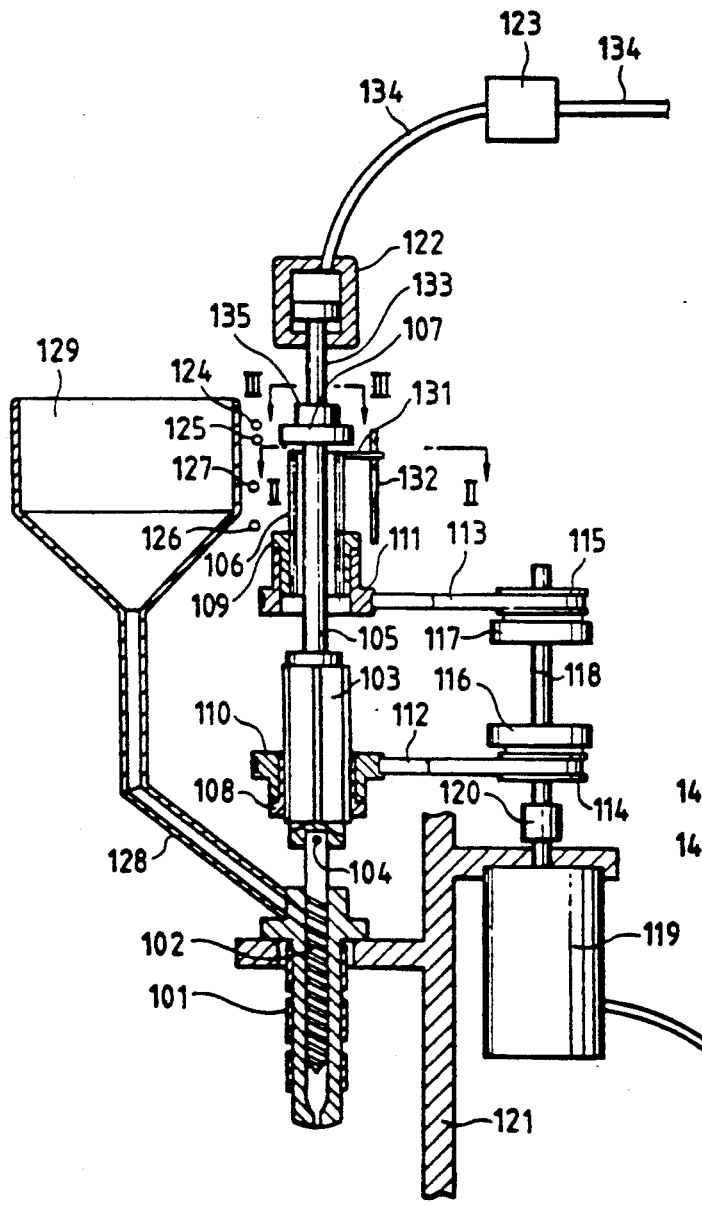
FIG. 5A illustrates the concept of an electrically driven type injection apparatus according to a second embodiment of the present invention.
FIG. 5B is a cross-sectional view taken along line II—II in FIG. 5A.
FIG. 5C is a cross-sectional view taken along line III—III in FIG. 5A.
Figure 6:
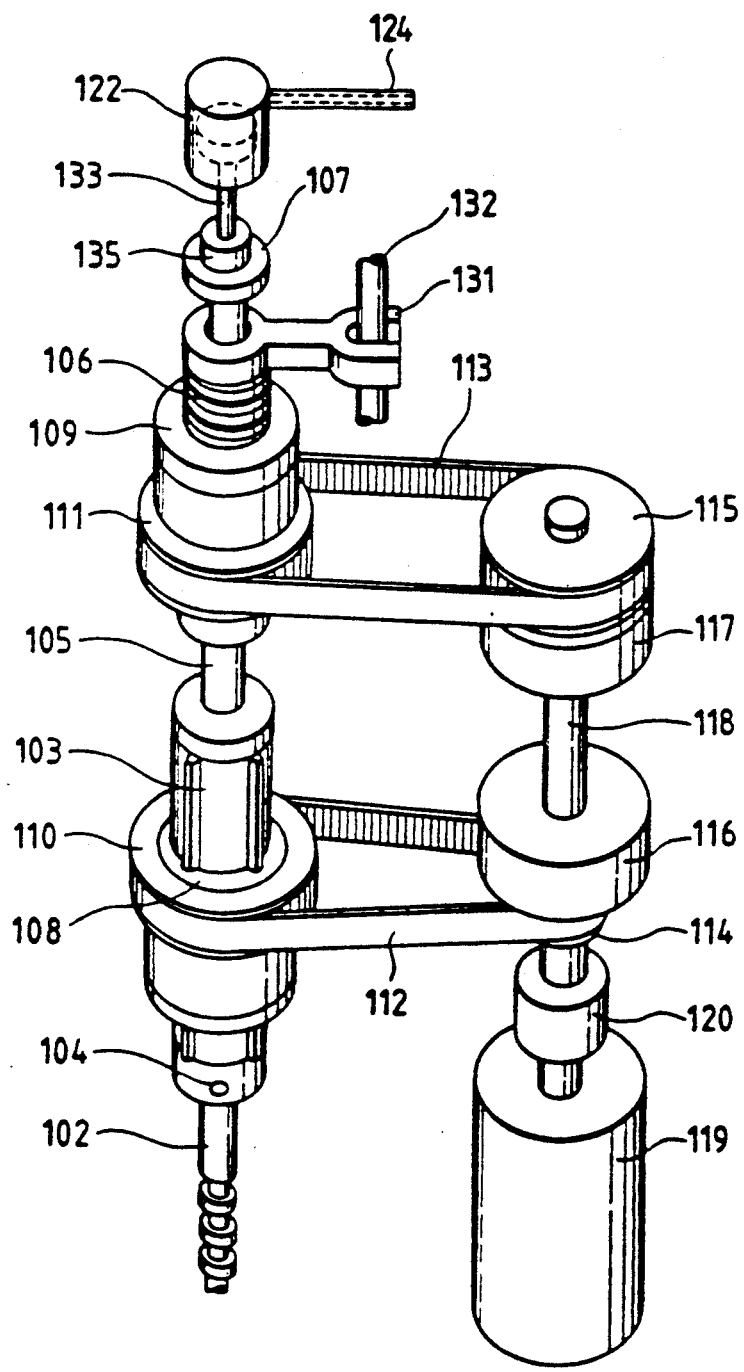
FIG. 6 is a perspective view of the vicinity of a rotating mechanism, a rectilinearly moving mechanism, a back pressure mechanism, a clutch and an electric motor in FIG. 5.
Figure 9:
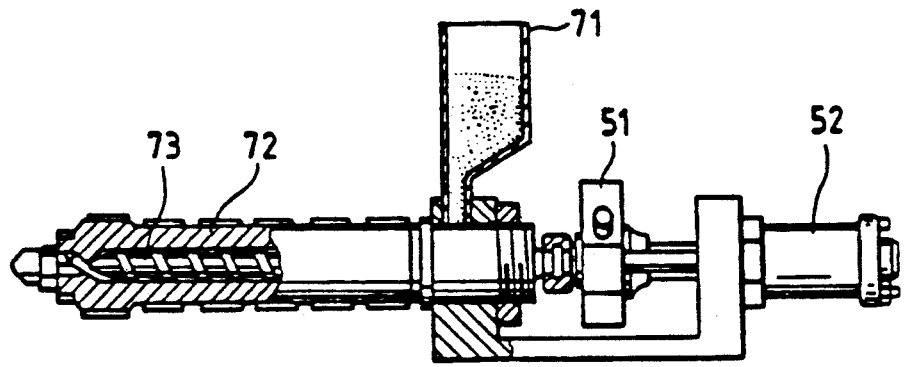
FIG. 9 is a cross-sectional view of a hydraulic type injection apparatus according to the prior art.
Figure 10:
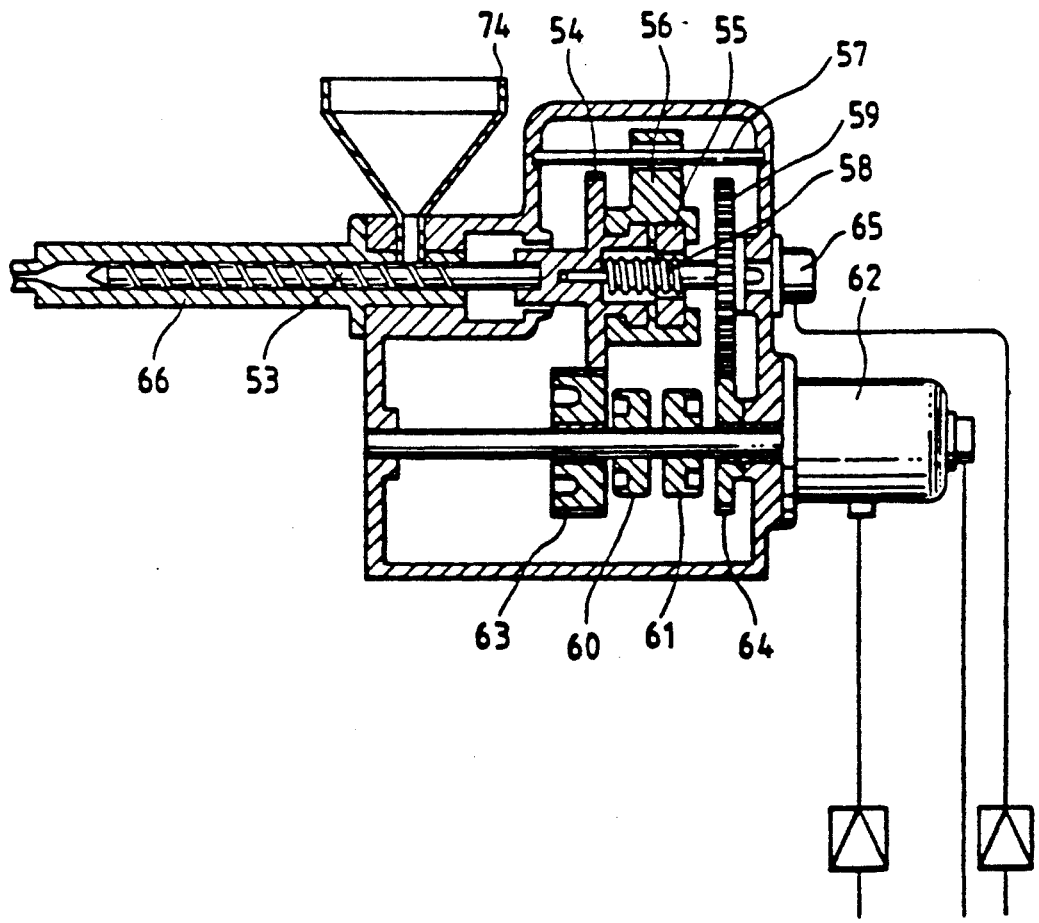
FIG. 10 is a cross-sectional view of an electrically driven type injection apparatus according to the prior art.

FIG. 5A is a schematic cross-sectional view of the electrically driven type injection apparatus according to the present embodiment, FIG. 5B is a cross-sectional view taken along line II—II in FIG. 5A, FIG. 5C is a cross-sectional view taken along line III—III in FIG. 5A, FIG. 6 is a perspective view of the vicinity of a rotating mechanism, a rectilinearly moving mechanism, a back pressure mechanism, a clutch and an electric motor in FIG. 5, FIGS. 7A-7E illustrate the operation of the present embodiment, and FIG. 8 is a flow chart of the injection molding by the apparatus of the present embodiment.

The electrically driven type injection apparatus of the present embodiment, as shown in FIGS. 5 and 6, comprises a screw 102 contained in a heating cylinder 101, a spline shaft 103 fixed to the screw 102 by a pin 104, a hollow ball bearing screw guide shaft 105 connected to the upper portion of the spline shaft 103 by a bolt or the like, not shown, and having a stop plate 107 secured to the upper end thereof, a hollow ball bearing screw 106 slidably fitted to the ball bearing screw guide shaft 105, and a cylinder rod 133 provided above the guide shaft 105 and bearing against the stop plate 107 of the guide shaft 105 through a thrust bearing 135, said constituents being disposed longitudinally on one and the same straight line.

A hopper 129 for supplying a material to be molded into the heating cylinder 101 is connected to the heating cylinder 101 through a pipe 128.

The reference numeral 119 designates an electric motor disposed parallel to these constituents and controlled by a controller 130. The electric motor 119 is secured to an injection unit base 121 fixedly holding the heating cylinder 101. An input shaft 118 is connected to the electric motor 119 through a joint sleeve 120. Two upper and lower clutches 116 and 117 (the clutch 116 will hereinafter be referred to as the measuring and kneading clutch and the clutch 117 will hereinafter be referred to as the injection clutch) are secured to the input shaft 118. The volume measuring and kneading clutch 116 is made connectable to an input timing pulley 114, which is connected through a timing belt 112 to an output side timing pulley 110 secured to the outer periphery of a spline nut 108 fitted to the spline shaft 103. Accordingly, when the clutch 116 is connected to the pulley 114, the spline shaft 103 is rotated by the rotative driving of the electric motor 119 through the pulley 114, the timing belt 112, the timing pulley 110 and the spline nut 108, whereby the screw 102 is rotated. The clutch 117 is made connectable to an input side timing pulley 115, which is connected through a timing belt 113 to an output side timing pulley 111 secured to a ball nut 109. Accordingly, when the clutch 117 is connected to the pulley 115, the ball nut 109 is rotated by the rotative driving of the electric motor 119 through the pulley 115, the timing belt 113 and the timing pulley 111, and along therewith, the hollow ball bearing screw 106 moves up and down. A projected piece 131 having a cross-section as shown in FIG. 5B is attached to the hollow ball bearing screw 106, and a guide bar 132 secured to the injection unit base 121 is fitted to the bifurcated end of the projected piece 131, whereby with the rotation of the ball nut 109 the hollow ball bearing screw 106 may not rotate, but may only rectilinearly move relative to the guide shaft 105.

The hollow ball bearing screw 106 is slidably fitted to the guide shaft 105 as described above and is designed to move up and down with the rotation of the ball nut 109, but the stop plate 107 of a larger diameter than the hollow ball bearing screw 106 is secured to the upper end of the guide shaft 105, and the lower end of the guide shaft 105 is secured to the spline shaft 103 of a larger diameter than the hollow ball bearing screw 106 and therefore, when the hollow ball bearing screw 106 moves up and down, it bears against the stop plate 107 above and bears against the spline shaft 108 below. Accordingly, since the stop plate 107, the guide shaft 105, the spline shaft 103 and the screw 102 are fixed integrally to one another as described above, the hollow ball bearing screw 106 moves up and down to push out the stop plate 107 or the spline shaft 103 with the rotation of the ball nut 109 operatively associated with the rotative driving of the electric motor 119, whereby the screw 102 can be moved up and down in the heating cylinder 101.

A back pressure cylinder 122 is mounted (not shown) on the injection unit base 121, and as described above, is disposed on the same straight line as the stop plate 107, the guide shaft 105, the spline shaft 103 and the screw 102, and moves the cylinder rod 133 up and down. Thereby the cylinder rod 133 can be lowered to pres the stop plate 107 and apply back pressure to the screw 102.

The reference numeral 123 designates a pressure regulator for the back pressure cylinder. The pressure regulator 123 is connected to the back pressure cylinder 122 through a tube 134, and is also connected to a supply source of compressed fluid (such as air), not shown. The pressing control of the back pressure cylinder 122 is accomplished by effecting the pressure control of the compressed fluid by the pressure regulator 123.

By the back pressure mechanism of such construction, a thrust can be imparted to the screw 102 against the pressure produced in the molten material to be molded gradually accumulated forwardly of the screw by the measuring and kneading of the material to be molded, thereby preventing bubbles or the like from being created in the molten material to be molded when no back pressure is imparted. Also, the back pressure mechanism of the present embodiment is designed such that as described above, back pressure is imparted by the pushing-out operation of the back pressure cylinder 122 and therefore, it is simple in construction and its control source can be constructed by a simple mechanism, and its regulation can also be accomplished easily.

A thrust bearing 135 provided at the lower end of the cylinder rod 133 and adapted to bear against the stop plate 107 is such that as shown in FIG. 5C, two angular bearings 136 and 137 are symmetrically superposed one upon the other and the inner races of the bearings 136 and 137 are fixed by a nut 138 threadably engaged from the stepped portion of the cylinder rod 133 and the end of the cylinder rod 133 and the outer races of the bearings are fixed by being nipped by between a cylindrical member 140 having a shoulder 139 and a cylindrical member 142 having a protruded portion 141 and when the cylinder rod 133 bears against the stop plate 107, the cylindrical members 140 and 142 rotate and the cylinder rod 133 does not rotate because of the bearings 136 and 137 being interposed.

The reference numerals 124, 125, 126 and 127 designate sensors for detecting the stroke of the screw 102 or the hollow ball bearing screw 106. The sensor 124 is a suck back completion detecting sensor, the sensor 125 is a volume measuring completion detecting sensor, the sensor 126 is a screw overrun detecting sensor, and the sensor 127 is a hollow ball bearing screw waiting position sensor. These sensors 124, 125, 126 and 127 are mounted so as to suitably move with respect to the injection unit base 121 and be capable of adjusting their detecting positions.

Although not shown in FIG. 5A, when injection molding is actually effected, a molding metal mold is disposed on the fore end of the heating cylinder 101 and a device or the like for opening and closing or clamping the metal mold is disposed.

Also, in the present embodiment, it is to be understood that a pressure keeping timer and a cooling timer are provided in the controller 130 to measure the pressure keeping time and the cooling time of the molded article in the metal mold cavity.

The operation of the electrically driven type injection apparatus of the present embodiment constructed as described above will now be described with reference to the operation illustrations of FIGS. 7A-7E and the flow chart of FIGS. 8A-8B. The symbols shown with S in parentheses indicate the steps of the flow chart of FIGS. 8A-8B.

In FIG. 7A, the hollow ball bearing screw 106 is in a position for rendering the hollow ball bearing screw waiting position sensor 127 ON and at the same time, the back pressure cylinder 122 and the measuring cluck 116 are also in their ON states (S101). At this time, the motor 119 is rotated clockwise (CW) (S102), and the screw 102 is rotated, through the timing belt 112, the spline nut 108 and the spline shaft 103 and ascends in the heating cylinder 101 while volume-measuring and kneading the material to be molded supplied into the heating cylinder 101. Simultaneously therewith, back pressure is imparted to the screw 102 by the back pressure cylinder 122 via the stop plate 107, the guide shaft 105 and the spline shaft 103.

When the screw 102 ascends to the level shown in FIG. 7B, it receives a signal indicative of the volume measuring completion detecting sensor 125 being ON (S103). Hereupon, the motor 119 is stopped (S104), and the measuring and kneading clutch 116 and the back pressure cylinder 122 become OFF (S105), thus completing the weight measuring and kneading.

On the other hand, when as described above, the measuring and kneading of the material to be molded are being affected in the cylinder 101, the material to be molded measured and kneaded at the previous step is contained in the metal mold (not shown) provided below the cylinder 101, whereupon pressure keeping, cooling and taking-out of the molded article are effected. At this time, it is necessary to effect suck back to prevent the material to be molded kneaded in the cylinder 101 from leaking from the injection port of the cylinder 101.

So, the measuring and kneading in the cylinder 101 are completed as described above the motor 119 becomes OFF (S104), and the measuring and kneading clutch and the back pressure cylinder are rendered OFF. Here, when the injection clutch 117 is rendered ON (S106), the motor 119 is rotated clockwise (CW)(S107). When the hollow ball bearing screw 106 ascends thereby through the timing belt 113 and the ball nut 109, the stop plate 107 is thrust up and suck back is effected. This suck back is effected until the hollow ball bearing screw 106 ascends to a position shown in FIG. 7C for rendering the suck back completion detecting sensor 124 ON (S108). At this time, the motor 119 is stopped (S109) and the suck back is completed. In FIG. 7C, a is the suck back stroke and b is the hollow ball bearing screw movement stroke during the suck back.

When the suck back is completed as described above and thereafter, the cooling timer counts up (S110), the clamping of the metal mold is released (S111) and the mold is opened (S112) and the molded article is taken out (S113), whereafter the mold is again closed (S114) and the mold is clamped (S115).

Subsequently, the motor 119 is rotated counter-clockwise (CCW) (S116) to inject the kneaded material to be molded into the metal mold clamped as described above. At this time, the injection clutch 117 is continuedly in its ON state and therefore, when the motor 119 is rotated counter-clockwise, a downward thrust is imparted to the hollow ball bearing screw 106. At this time, the hollow ball bearing screw 106 is first idly fed, whereafter as shown in FIG. 7D, the lower end portion of the hollow ball bearing screw 106 strikes against the shoulder 103a of the spline shaft and the screw 102 is pushed downwardly, whereby the injection into the metal mold takes place. Since the back pressure cylinder 122 is OFF, the cylinder rod 133 remains in the position of FIG. 7C.

The control of the motor 119 during injection is effected by the controller 130, any variation in the consumed current value of the motor 119 at the completion of injection is detected (S118), and the control of the motor for injection is changed over from the speed control (S117) to the current value control (S119), whereby injection is completed, and shift is made to a pressure keeping state in which a predetermined pressure is applied to the material to be molded. That is, the number of rotations of the motor 119 is made constant to make the descending speed of the ball bearing screw 106 constant, and injection is effected at a constant speed. However, during this injection, the pressure of the material to be molded becomes higher as the metal mold cavity is filled with the material to be molded and therefore, to maintain a constant injection speed as described above, it is necessary that a gradually increasing electric current flow to the motor 119. Accordingly, by determining a constant current value and regarding the time when the consumed current value has reached this constant value as the time of completion of injection, the time of completion of injection can be detected by the measurement of the consumed current value. By changing over the control to such control that at this time of completion of injection, the value of the electric current imparted to the motor 119 becomes constant, a constant pressure can be applied to the material to be molded in the metal mold cavity to thereby accomplish pressure keeping.

After the motor 119 has been changed over to the current value control, the counting by the pressure keeping timer is started (S119). Assuming that FIG. 7D is the state in which injection has been completed, c is the hollow ball bearing screw movement stroke and d is the injection stroke. The reference numeral 126 designates a screw overrun detecting sensor, and in the normal operation, injection becomes completed at a position above the sensor 126.

When the pressure keeping timer then counts up (S120), the motor 119 is stopped to complete pressure keeping, and the counting by the cooling timer is started (S121).

When pressure keeping is completed as described above, the motor 119 is rotated clockwise with the injection clutch 117 kept in its ON state to prepare for the next measuring and kneading (S122), and the hollow ball bearing screw 106 is lifted until the hollow ball bearing screw waiting position sensor 127 becomes ON, and when the hollow ball bearing screw waiting position sensor 127 is rendered ON (S123), the motor 119 is stopped (S124) and the hollow ball bearing screw 106 is caused to wait at that position as shown in FIG. 7E. At this time, the injection clutch 117 is rendered OFF (S125). In FIG. 7E, e is the hollow ball bearing screw movement stroke.

After the steps as described above have been passed, the volume measuring clutch 116 and the back pressure cylinder are again rendered ON (S101), and the above-described steps are repeated, whereby the kneading and measuring of the material to be molded, back pressure, suck back and injection can be effected.

As described above, in the present embodiment, the screw rotating spline shaft, the screw propelling hollow ball bearing screw, etc. are disposed vertically on the same straight line on the propulsion shaft of the screw so that the back pressure control during measuring may be effected by the pressure control of compressed fluid such as air supplied to the cylinder provided at the rear end of the guide shaft 105 and therefore, the simplification of the back pressure device and the facilitation of regulation become possible. At the same time, the compactness of the screw propelling and rotating mechanism becomes possible.

Especially in the present embodiment, the injection apparatus is of the vertical type and therefore, the width and depth in the installation area are reduced and thus, it has become possible that the apparatus is easily introduced into an assembly line in which no molding machine could heretofore be installed.

Further, in the present embodiment, a series of operations of the screw such as measuring, kneading, suck back and injection are effected by a single electric motor 119 and two clutches 116 and 117 and therefore, a more inexpensive injection apparatus has become possible.

In the above-described embodiment, the spline shaft 103 is provided at the rear end of the screw 102 and the hollow ball bearing screw guide shaft 105 is provided at the rear end thereof, but alternatively, the hollow ball bearing screw guide shaft may be provided at the rear end of the screw and the spline shaft may be provided at the rear end thereof to thereby provide a rectilinearly moving mechanism and a rotating mechanism in the named order. In this case, the back pressure cylinder is provided so as to press the rear end of the spline shaft.

In the above-described embodiment, the guide shaft 105 is made smaller in diameter than the spline shaft 103 and the boundary portion between the guide shaft 105 and the spline shaft 103 is provided as a restraining portion below the hollow ball bearing screw 106, but where the guide shaft 105 is larger in diameter than the spline shaft 108, a flange portion or the like having a diameter larger than the diameter of the hollow ball bearing screw is provided in said boundary portion, whereby the restraining portion of the hollow ball bearing screw is formed.

Also, in the above-described embodiment, the rotary shaft of the rotating mechanism is employed as the spline shaft and the rotative driving force transmitting mechanism is comprised of the timing pulley 114, the timing belt 112, the timing pulley 110 and the spline nut 108, but alternatively, there may be adopted a construction in which the rotary shaft is replaced by a wide gear and a gear meshing with the input shaft 118 is mounted on the input shaft and the gear mounted on the input shaft 118 slidably transmits a rotational force to the wide gear.

Also in the rectilinearly moving mechanism, instead of using the timing belt 113, a gear may be mounted on the ball nut 109 and a gear meshing with the input shaft 118 may also be mounted on the input shaft, and this may be employed as the rotative driving force transmitting mechanism in the rectilinearly moving mechanism.

Further, the above-described embodiment is designed such that the rotating mechanism and the rectilinearly moving mechanism are driven by a single motor 119 and two clutches 116 and 117, but alternatively, the clutches may be eliminated and an electric motor may be used for each of the rotating mechanism and the rectilinearly moving mechanism.

Furthermore, the above-described embodiment is a vertical type molding machine, but the present invention can also be easily applied to a horizontal type molding machine.

As described above, in the electrically driven type injection apparatus of the present invention, a screw contained in a cylinder, a rotating mechanism for rotating the screw, a forwardly moving mechanism for moving the screw forwardly and a back pressure mechanism for imparting back pressure to the screw are successively arranged on the propulsion shaft of the screw. Therefore, the compactness of the mechanisms for forwardly moving and rotating the screw becomes possible and for example, by disposing the respective elements vertically, the installation area for the apparatus may be very small.

Also, the injection apparatus of the present invention is of a construction in which the rotational movement and forward movement of the screw are accomplished by electric motors and therefore, the environment around the apparatus can always be kept clean.

Further, if there is adopted a construction in which the rotational movement and forward movement of the screw are accomplished by a single electric motor provided with a clutch mechanism, the cost required of the injection apparatus may be low.

Also, in the present invention, the back pressure mechanism of the screw can be effected by the pushing-out operation of the back pressure cylinder and therefore, the construction becomes simpler and the control source therefor can be constructed by a simple mechanism, and regulation can be accomplished easily.

What is claimed is:

1. An electrically driven injection molding apparatus, comprising:
    a screw for kneading a material to be molded in a cylinder;
    a first motor for rotating said screw and measuring an amount of said material to be molded;
    a back pressure cylinder connected to said screw for imparting back pressure to said screw;
    rectilinearly moving means connected to said back pressure cylinder for rectilinearly moving said back pressure cylinder;
    a second motor for driving said rectilinearly moving means;
    a volume measuring sensor for detecting the completion of measuring and outputting a signal;
    a sensor dog connected to said crew; and
    first logic means for receiving the signal from said volume measuring sensor as an input sensor and controlling said first motor.

2. An apparatus according to claim 1, further comprising:
    a suction pressure detecting sensor; and
    second logic means for receiving signals emitted from said suction pressure detecting sensor and said volume measuring sensor as inputs and drivingly controlling said second motor.

3. An apparatus according to claim 1, further comprising a ball nut receiving member fixed to a rotary shaft to which said screw is connected, an injection motor serving as said second motor, a ball bearing screw connected to an output shaft of said injection motor and threadably engaged with a ball nut secured to said ball nut receiving member, and a volume measuring motor serving as said first motor is connected to said rotary shaft through a rotation transmitting gear, wherein said volume measuring motor is braked during the rotative driving of said injection motor to thereby stop the rotation of said ball nut.

4. An apparatus according to claim 3, further comprising:
    an injection completion detecting sensor; and
    change-over means for said injection motor, said change-over means changing over said injection motor from speed control to an electrical current value control.

5. An apparatus according to claim 4, wherein said change-over means includes:
    comparing means for detecting an electric current of said injection motor and detecting whether the electrical current value has reached a predetermined value; and
    constant current means for supplying a constant current to said injection motor based on a signal from said comparing means.

6. An apparatus according to claim 5, further comprising a pressure keeping counter adapted to start counting by the signal of said comparing means.

* * * * *

UNITED STATES PATENT AND TRADEMARK OFFICE
CERTIFICATE OF CORRECTION

PATENT NO. : 5,217,725
DATED : June 8, 1993
INVENTOR(S) : Ryohei Inaba, et al.

It is certified that error appears in the above-indentified patent and that said Letters Patent is hereby corrected as shown below:

COLUMN 4:

Line 7, "electric." should read --electric motor.--.

COLUMN 7:

Line 31, "actually" should read --actual--.

COLUMN 12:

Line 67, "pres" should read --press--.

COLUMN 14:

Line 1, "cluck" should read --clutch--.
Line 27, "molded kneaded" should read --molded and kneaded--.

COLUMN 17:

Line 42, "crew;" should read --screw;--.

Signed and Sealed this

Nineteenth Day of April, 1994

Attest:

BRUCE LEHMAN

Attesting Officer  Commissioner of Patents and Trademarks